T. J. Hall.
Gang Plow.
No. 12,791. Patented May 1, 1855.
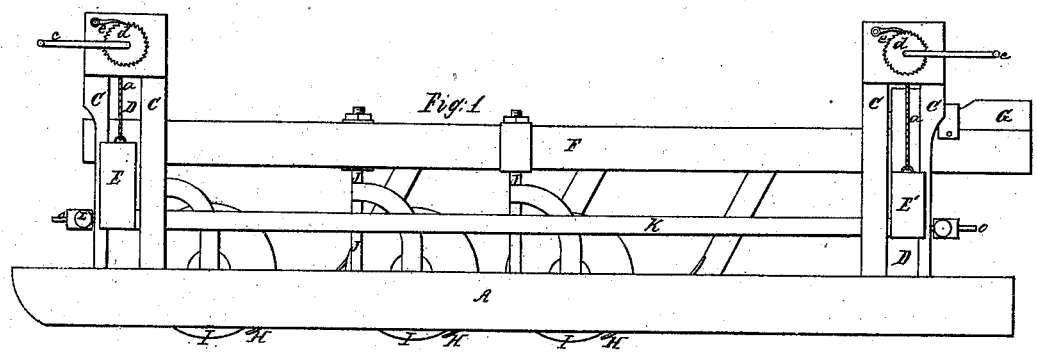
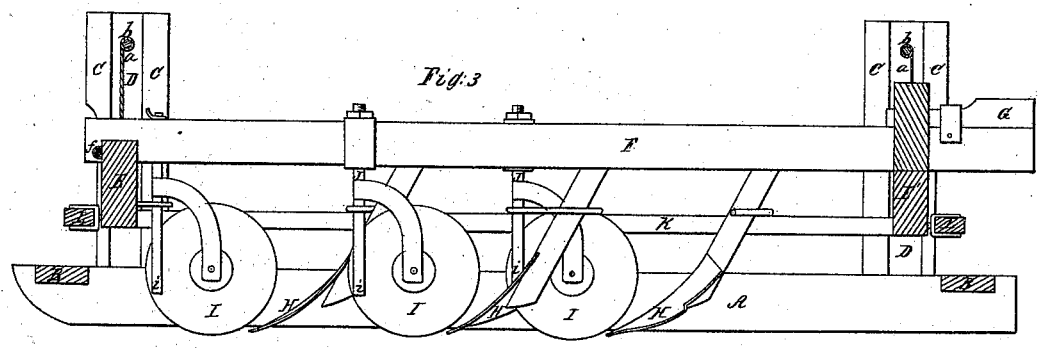
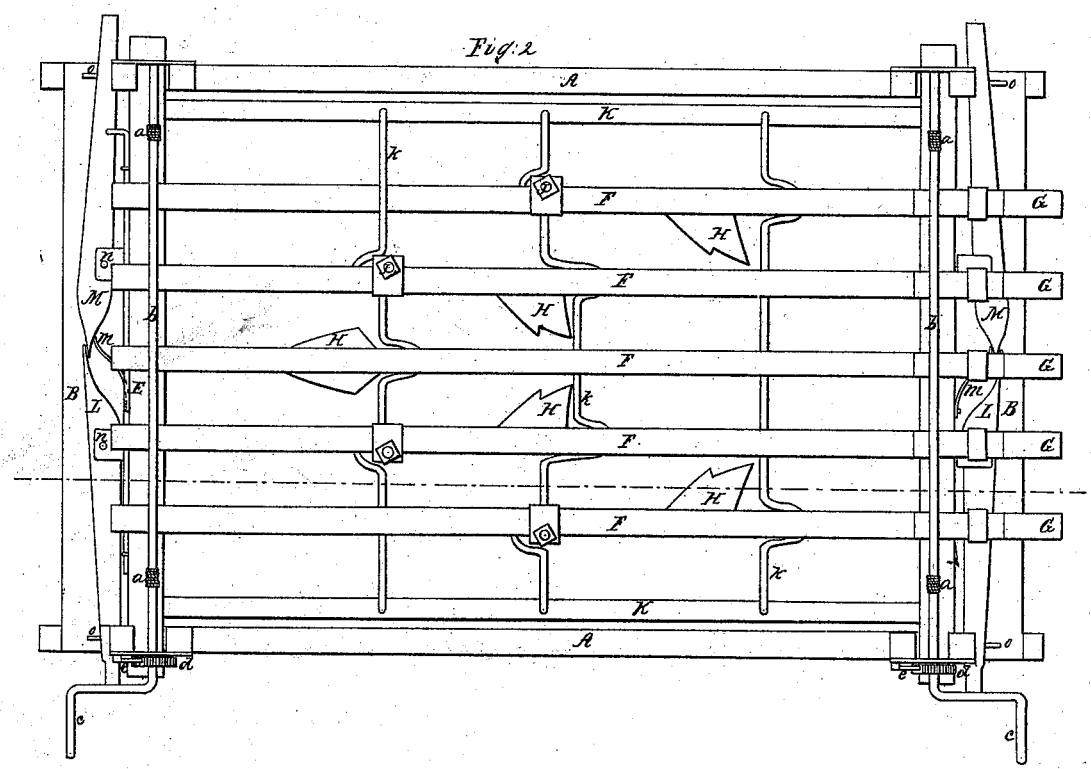

UNITED STATES PATENT OFFICE.

THOMAS J. HALL, OF TAWAKANA HILLS, TEXAS.

IMPROVEMENT IN GANG-PLOWS.

Specification forming part of Letters Patent No. 12,791, dated May 1, 1855.

*To all whom it may concern:*

Be it known that I, THOMAS J. HALL, of Tawakana Hills, in the county of Limestone and State of Texas, have invented certain new and useful Improvements in Gang-Plows; and I do hereby declare the following to be a full, clear, and exact description of the same, reference being had to the accompanying drawings, making a part thereof, in which—

Figure 1 represents a side elevation. Fig. 2 represents a top plan, and Fig. 3 represents a longitudinal vertical section, taken through the red line $x\ x$, of Fig. 2.

Similar letters in the several figures denote like parts.

The nature of my invention relates to the so constructing of a gang or series of plows in one frame as that they may have an adjustment on the runners which support and carry them, as well as a self-adjusting property individually, so that they may be set for furrows of any given depth and each of the series may yield to any undue obstruction in the line of their furrows without throwing out any of the others.

To enable others skilled in the art to make and use my invention, I will proceed to describe the same with reference to the drawings.

A A are two substantial runners for supporting the entire plow or series of plows, preferring runners to wheels, for the reason that they will not dip into depressions in the ground, and thus allow the plows to run into the ground beyond their stipulated depth.

B B are front and rear cross-pieces for uniting the two runners, and thus making a firm frame for supporting the gang of plows. Near each of the four corners of the frame thus made are framed in the uprights C C C C, &c., so as to leave a slot, D, or opening between them, in which work transversely of the frame the two beams E E', which are suspended by cords or chains $a$ to a shaft or shafts, $b\ b$, suitably arranged on top of the uprights C. On the ends of these shafts are placed cranks $c$, and near the cranks a ratchet, $d$, into which a pawl, $e$, on the uprights take, so that said beams E E' may be raised or lowered at pleasure, and then held at such height as may be desired, for regulating the depth at which the plows shall run.

To the front beam, E, are pivoted or hinged, as at $f$, Fig. 3, the series of plow-beams F F F, &c., the rear ends of said plow-beams resting in open mortises cut in the rear cross-beam, E', but so as to be free to rise should the plow, which may be attached to it, be thrown out of the ground. The ends of the plow-beams at the rear may be weighted with weights G, to hold them down or into the soil, and these weights may be increased or diminished or entirely dispensed with, as the character of the soil may require.

The plows H H H H, &c., of any suitable form, are hung to these beams F, and the shares of the plows or their mold-board may be so arranged as to turn all the furrows to one side, or part to one side and part to the other, as may be desired. The plows are set harrow-teeth fashion, so that the furrow-slices shall be cut one behind the other.

To the beams F are also hung, in advance of the point of each plow of the series, a disk cutter, I, the stock J of which is swiveled in the said beams, and which cutters have a front support or guide, $i$, to direct their course, as explained in a former application which I have made for Letters Patent. Braces $k$ extend across from the side pieces, K K, which are bent around the stem or stock J of the cutting-disk, to give additional support to the machine.

At both the front and rear of the plow-frame are two levers, L M, having their fulcras at $n$. The point of the lever L bears against the outside point of the lever M, and behind M is a spring, $m$, and in each of said levers is a pin or bolt, $o$, which passes into and through holes in the uprights C and into the cross-beams E E', to hold them in place when adjusted. By taking hold of the lever and drawing its pin $o$ out of the hole the same motion causes the lever M to draw out its pin. Then, by throwing out the pawl $e$ from the ratchet $d$ and turning the crank $c$, the cross-beam may be raised or lowered at pleasure, carrying with it the series of plow-beams F, which rest on it. By this contrivance the depth of furrow is regulated; but independent of this fixed adjustment the plow-beams F have a self-adjustment at the rear, they only being controlled from rising too freely or too high by the weights G, and although they may rise to yield to any obstruction they cannot drop below a given distance— that is, lower than the cross-beam E', and are thus prevented from allowing the plows to run into the soil.

Any number of plows may be used within the capacity of the team or power which draws it.

Having thus fully described the nature of my invention, I would state that I do not claim a gang of plows, nor do I claim the hanging of the plows to hinged or pivoted beams, these being well known; but

What I do claim as new, and desire to secure by Letters Patent, is—

The arrangement of the plows and pivoted beams with the adjustable cross-beams so that the plows may have a convenient permanent adjustment in connection with their self-adjusting property in the plow-beam, as set forth and described.

THOS. J. HALL.

Witnesses:
THOMAS H. UPPERMAN,
EMIL COHEN.